Sept. 4, 1962

T. N. CARTER 3,052,339

CONVEYING APPARATUS

Filed Feb. 18, 1960

INVENTOR
THOMAS N. CARTER, DECEASED
BY VERA A. CARTER, EXECUTRIX

BY *Donald A. Garding Jr.*

ATTORNEY

Sept. 4, 1962  T. N. CARTER  3,052,339
CONVEYING APPARATUS
Filed Feb. 18, 1960  2 Sheets-Sheet 2

INVENTOR
THOMAS N. CARTER, DECEASED
BY VERA A. CARTER, EXECUTRIX

BY *Donald A. Gardner Jr.*

ATTORNEY

3,052,339
CONVEYING APPARATUS

Thomas N. Carter, deceased, late of Hamilton, Ohio, by Vera A. Carter, executrix, Hamilton, Ohio, assignor to Champion Papers Inc., Hamilton, Ohio, a corporation of Ohio
Filed Feb. 18, 1960, Ser. No. 9,533
5 Claims. (Cl. 198—37)

This invention is concerned with materials handling. More particularly, the invention is concerned with a conveying system and components thereof, which system is peculiarly adapted for use as a bunching or article gathering system and wherein the units are designed to provide for maximum flexibility and use in variations of such a system.

There are presently available on the open market numerous devices and arrangements designed to facilitate the handling and arranging of packages, cartons and the like under various circumstances. To date, however, such systems have not found extended utiliity in the paper industry because of the myriad of conditions which must be met in the paper industry, and because most of the available materials handling equipment must be subjust to considerable modification to adapt it to these varied conditions with the net result that each such system becomes custom made and prohibitively expensive. In addition most conventional equipment relies on anti-friction rollers, skate wheels, etc., to establish a supporting surface for the articles being conveyed. Such instrumentalities are not satisfactory in the paper industry because they mark or deface paper "lifts," i.e., stacks passing over them.

The present invention represents a device which has particular adaptability to the conditions which exist in the paper industry. It is also so designed that it has utility in any situation which requires the conveyance of articles from one point to another. Further, the use of the apparatus in the manner which will be described hereinafter, results in an efficient bunching system wherein articles placed on the conveyor at irregular intervals or at various locations, may be grouped toward the end of the entire system. In addition a significant feature is that the components making up the system are capable of utility in a variety of ways such that they may be combined in various arrangements at a minimum of expense and with maximum interchangeability. This flexibility avoids the usual situation as mentioned, where the conveying system must be tailormade to the circumstances to which it can be applied.

Accordingly, an object of the invention is to produce a bunching conveyor system.

The further object of the invention is to produce a conveying system comprised of individual components of similar structural and operational characteristics.

A still further object of the invention is to produce a conveying unit of relatively simple design, yet capable of utility under a variety of conditions and in a multiplicity of applications.

Another object of the invention is to produce a bunching conveyor system made up of a plurality of identical units which may be arranged in a variety of ways to produce the desired result without the necessity of special components and the like.

A further object of the invention is to produce a conveying system particularly adapted to the paper industry due to its smooth conveying surface, lacking in rollers, wheels, etc., which damages paper conveyed thereon.

These and other objects of the invention not specifically eluded to but recognized as being inherent therein may be accomplished by providing a horizontal surface traversed by at least one or more positional moving belts, wherein the surface includes a plurality of air valves or apertures adapted to permit the formation of a fluid cushion beneath an article disposed on the surface and wherein the moving belt may be actauted to a retracted position out of engagement with an article supported on said fluid cushion or an operative position wherein the moving belt is in engagement with and will cause movement of an article across the horizontal surface and means responsive to conditions occasioned by the movement of articles on said surface acting to energize the movable belt to either of its two positions.

The invention including a simple bunching system and the elements which comprises a said system are being described in detail, reference being made to the attached drawings, in which.

Figure 1:
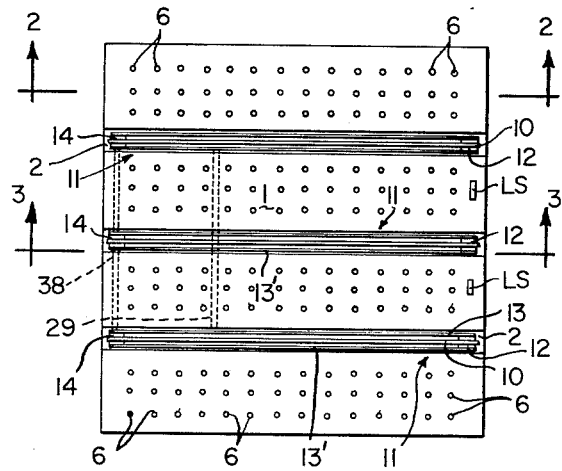
FIG. 1 is a top view of one unit.

Referring now to FIG. 1, it will be seen that each individual conveying unit resembles a table structure and is comprised of a generally equal sided horizontal perforated article carrying surface 1. The article supporting surface 1 is broken at equally distant intervals by a plurality of parallel trough-like recessed areas 2 which extend entirely across the surface 1.

As seen in FIG. 1, each recessed area 2 contains a belt 10 which is driven as will be seen subsequently. These belts are carried on frames 11, which as will be seen, are vertically movable, and which in turn, also carry pulleys 12 and 14 over which the belts 10 are trained.

Figure 2:
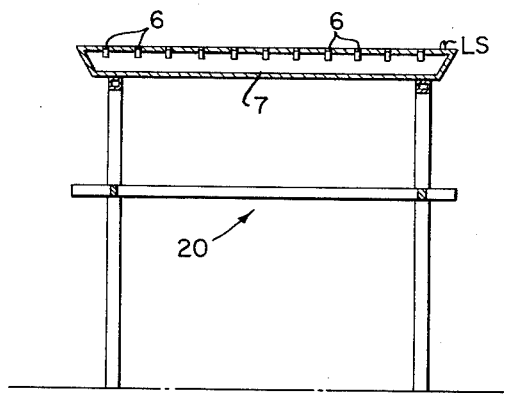
FIG. 2 is a side elevational view of the unit shown in FIG. 1 taken along the line 2—2 thereof.

As seen in FIG. 1, the horizontal article supporting surface 1 is provided with a series of apertures 6 which are, as further illustrated in FIG. 2, in communication with a plenum chamber 7 disposed underneath the perforate surface which in effect form the top wall thereof. The apertures may be defined by a series of normally closed pneumatic valves of the type manufactured by the Lamb, Grays Harbor Company, and shown in Patent Number 2,176,307. These valves are check valves, held closed by pneumatic pressure in the plenum chamber and are opened by contact of a baseboard or by an article itself allowing discharge of air to form a relatively friction-free cushion between the bottom of the article and the top of the conveying surface. The conveying unit as defined thus far, is substantially conventional with the exception of the recessed areas 2 containing the driven belts 10. It will be noted that three such belts 10 are disclosed. While one or two belts symmetrically positioned or centrally located about and along the centerline of the surface 1 would suffice adequately, three belts 10 are more to be preferred to prevent articles from becoming off-center to such an extent as to be no longer engaged by the belt 10. In this latter case, obviously, a wide belt or a pair of wider belts, in the case of two such belts might be preferable to the narrow belts, 10 illustrated in FIG. 1.

Figure 3:
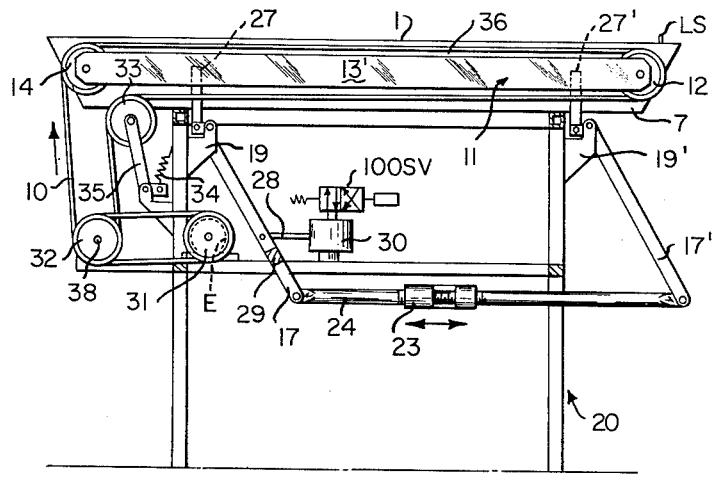
FIG. 3 is a further sectional elevational view, taken along the line 3—3 of FIG. 1.

Turning now to FIG. 3 it will be seen that because the belts 10 and their supporting frames and pulleys are vertically movable to a position wherein the upper reaches of the belts 10 are disposed in a common plane slightly above that defined by the horizontal conveying surface 1, an article resting on surface 1 may be moved thereacross by the engagement of the belts 10 with its lower surface. This is accomplished because the coefficient of friction between an article and surface 1 is less than that which exists between the bottom of the articles being conveyed and the belts 10. On the other hand, movement of the belts to a lower position disengages them from such an article and the article will remain stationary on the supporting surface.

Having described the overall appearance and general operation of the individual unit, reference will now be made to FIG. 3 wherein the operating mechanisms for raising and lowering the belts as well as driving them are shown in detail.

As shown in this FIGURE 3 the plenum chamber 7 and also the conveying surface 1 is carried on a series of angle members which define table legs and a frame designated generally as 20 which supports the conveying surface 1 a desired distance above the floor level and which in turn supports the various instrumentalities used for driving and effecting vertical movement of the belts 10 to either operative or in unoperative position. It will be seen that each of the belt carrying frames 11 are comprised of a pair of identical longitudinal bar members 13, 13¹ fastened together in spaced parallel relationship and provided at each end with pulleys 12 and 14 respectively, over which the belt 10 is trained. Each frame 11 is connected to the main table frame 20 by means of a pair of bell cranks 17 and 17¹. From an inspection of FIG. 3, it may be seen that these bell cranks 17, 17¹ are mounted on brackets 19, 19¹ suitably fixed on the frame 20. These bell cranks 17 and 17¹ act as levers having unequal length arms and are mounted so as to pivot about parallel horizontal axes. The short arms of each bell crank is connected to link members 27, 27¹ respectively. These links 27, 27¹ are fixed, as by welding to the movable frame members 13, 13¹ as shown in FIG. 3. The longer arms of bell cranks 17, 17¹ are in turn, connected by a rod 28 to a reciprocating pneumatic motor 30. It will be apparent that movement of the bell cranks 17, 17¹ in one direction, that is toward the left as shown in the drawing, will cause the carriage members 11 to move vertically with respect to the fixed supporting frame 20 and the horizontal conveying surface 1 carried thereby. Movement of these bell cranks 17, 17¹ in the opposite direction will cause the carriage member 11 to be withdrawn into the recessed areas 2. Each of the carriage assemblies 11 is mounted on a similar motion producing mechanism. Preferably the pneumatic motor 30 acts only on the center assembly since motion is transmitted simultaneously to the other mechanisms by means of horizontally extending tie bars 24, 29, shown in both FIGS. 1 and 3. All of the carriage assemblies 11 may be conveniently raised and lowered simultaneously by the one motor 30. It will be noted that bar 24 is provided with a turnbuckle assembly 23 which allows the total length of this bar to be adjusted, assuring that the belt carrying frame 11 will always be level with respect to the top surface 1 of the table.

Also mounted on the frame assembly 20 is an electrical motor E. The motor E is directly connected to a pulley 31 which in turn is connected to a further pulley 32 also mounted on the frame and carried by a transverse shaft 38. Also mounted on shaft 38 and driven thereby are a plurality of pulleys (not shown) of a diameter equal to those mounted on the carriage 11. Each of these latter pulleys is disposed in the same vertical plane as said pulleys 12 and 14. Thus each belt 10 can be trained around the pulleys mounted on shaft 10, pulleys 12 and 14 mounted on each of the carriages 11 and may be continuously driven by the motor E.

Since the belt carriages 11 move vertically it will be obvious that the center-to-center distance between pulleys mounted on shaft 38 and each of the pulleys 14 will vary depending on whether the carriages 11 are in the raised or lowered position. Thus the effective length of the belt 10 must be varied to accommodate this relative movement. To this end the belt is trained also over a pulley 33 mounted on a bell crank 35 which in turn pivotally fixed to the frame assembly 20 beneath plenum chamber 7. The opposite arm of bell crank 35 to that carrying pulley 33 is connected to a coil spring 34 also attached at one end to frame 20. As illustrated in FIG. 3 the pulley is biased against belt 10 which is also trained over it such that a bight is formed in the belt. The extra length, therefore, is available such that as the carriages 11 are raised and lowered bell cranks 35 rock about their pivot points to permit the excess length of belts 10 to accommodate the change in distance between pulleys 14 and those carried on shaft 38 as the carriages 11 are raised. The pulleys 33 also act to take up the slack in belts 10 when the carriages 11 are in lowered position.

Referring to FIGS. 1 and 3 it will be seen that the top flight of each of the belts 10 between pulleys 12 and 14 might have a tendency to sag because of the distance between these pulleys. Obviously, since it is only frictional contact between belts 10 and an article resting on the air table surface 1 that causes the article to traverse the table, it is essential that this frictional contact be constant from one pulley to the other. Accordingly, between the pulleys 12 and 14 on each carriage 11 there is provided a support plate 36 preferably fashioned from a wear resistant material. This plate contacts the underside of the belt 10 to prevent such undesired sagging.

Figure 4:
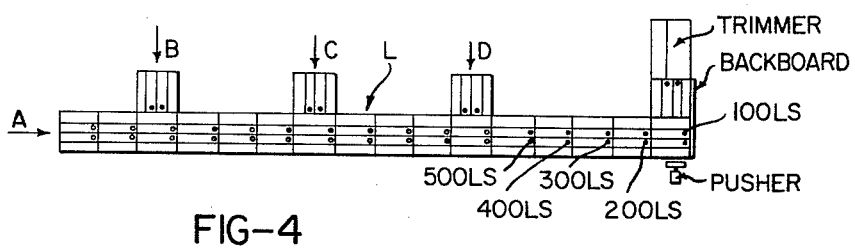
FIG. 4 is a top plane view of a bunching conveyor system comprised of units as illustrated in FIGS. 1 and 2.

Having described the structure and operations of the individual table, consideration will now be given to the manner in which the individual units may be grouped to form a bunching conveyor. To this end FIG. 4 is an example of such an arrangement as might be found in a paper mill. As shown a series of air table units such as that described herein are placed in end-to-end relation to form a conveying line L which may convey articles, in this case stacked sheets of paper known as lifts, from the cutters to a trimmer. The output from the cutters may be introduced into the system at stations A, B, C and D. It is to be expected and in fact it does happen that the input to stations A, B, etc., is irregular. It also is a fact that for most efficient operation the rate of input to the trimmer should be such that there is always a lift or lifts of paper awaiting the trimming operation. For this reason it is desirable that lifts loaded on the conveyor L at stations A, B, C, etc., are immediately conveyed to the trimmer and are "bunched" at this location awaiting their passage through the trimmer. It will be noted that, in FIG. 4, the trimmer is disposed at a right angle to conveying line. It will be appreciated that this arrangement is shown merely to illustrate the adaptability of the units and a system made up of the units to varying circumstances and conditions.

At this point, and as thus far described, the necessity for retractable belts is not readily apparent. For example, if the belts 10 are normally in operative position articles will be conveyed from stations A, B, etc., toward the trimmer. In the case of the system shown in FIG. 4, it is obvious that a bunching effect would be produced as the lifts of paper move down the line from left to right and the initial lift contacts backboard 40, and the succeeding lifts contact one another if the belts 10 are merely kept in a raised operative position. While the desired bunching at the trimmer would result, it would not be accomplished without serious penalties. However, if belts 10 were not retractable the movement between the belts and an article held stationary inevitably would cause marring and scratching of the articles. This is particularly true where lifts of paper would be conveyed since the sheets in contact with the belts would be ruined. However, if the bunching is effected by causing the belts to retract no damage to the articles results. Thus the belts 10 are retractable to cause an article to "stand" at a particular location in the system without being marred or otherwise damaged. To this end each unit is provided with a control system to raise and lower the belts in response to the position of articles on the various units making up a bunching conveyor system. In FIG. 5, therefore, there is disclosed an electrical system which may be readily incorporated into each table unit and which will perform the desired function. It will be noted that the disclosed control system utilizes micro-switches as the sensing and actuating stimulus for the control system. In addition, such sensing media as photo-electric cells and equivalent means can be readily utilized. A further modification is illustrated in part in FIG. 5a wherein pressure sensitive means is used to stimulate the control system. Whichever system of control is utilized, it must be such that it is self contained in each unit such that various units may be connected together by the simple expedient of mating plugs whereby to establish the proper relationship between adjacent tables.

Figure 5A:
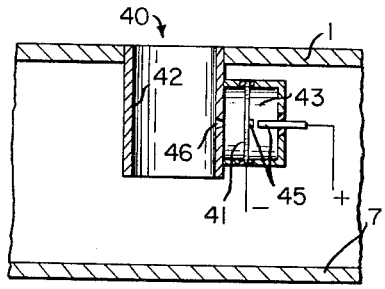
FIG. 5a is an illustration of a modification of said control system shown in FIG. 5.
Figure 5:
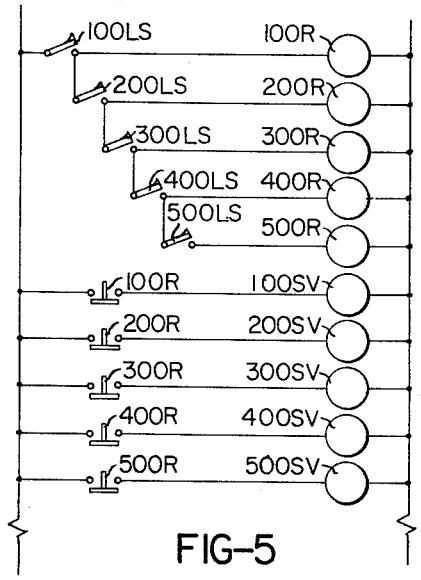
FIG. 5 is a schematic diagram of one form of control system which may be used in combining the units to form the bunching conveyor illustrated in FIG. 3.

Considering now FIG. 5 in conjunction with FIGS. 4 and 5a, it will be seen that each unit making up the system is provided with a sensing element, in this case, micro-switches which are positioned at one edge of the units so as to be contacted by lifts of paper passing thereover. As illustrated in FIG. 4, these switches are designated as 100LS, 200LS, 300LS and 400LS, etc. It will be understood that the switches may be actuated by two article contact elements disposed between the adjacent belts 10, in the event a lift should become "off center" on the conveying line L. It will also be noted, that in every case the switches, or their equivalent are positioned at the "trailing end" of each unit. In other words, the lifts of paper or other articles, as the case may be, pass over each unit before contacting the sensing element incorporated in that particular unit.

Assuming that lifts of paper are being introduced onto the conveying line L at stations A, B, C, etc., in random fashion. The first of these lifts will be conveyed along the line L toward the backboard, since the normal position of the belts is in an operative position due to the fact that spring biased, solenoid operated valve 100SV of each unit is normally positioned to operate motor 20 to hold the belts 10 in operative position, opposite to that shown in FIG. 3 where the belt 10 is shown in inoperative position and valve 100SV positioned accordingly. The movement continues from unit to unit until the first lift of paper contacts the backboard where it will be in contact with the switch 100LS. referring to FIG. 5, it will be seen that as switch 100LS is closed, it energizes a relay 100R. This relay 100R, as well as relays 200R, 300R, etc., is a time delay relay requiring the lapse predetermined period of time before contacts 100R close to energize solenoid valve 100SV to retract the belts 10 as illustrated in FIG. 3. The use of time delay relays such as 100R, etc., is essential in that as the lifts pass over the switches 500LS, 400LS, etc., toward the backboard, there must be no interruption of their flow until the conditions to be described are obtained.

Time delay relays of the type used herein are manufactured by various concerns. One of the more preferable devices is manufactured by the Allen Bradley Co., and incorporates a feature wherein the delay period may be adjusted from a period of but a few seconds up to several minutes. When it is remembered that the lifts of paper or articles being conveyed may vary in size and hence the period of time required for each article to traverse a sensing point, assuming that conveying speed is constant, will vary, it becomes apparent that it is extremely advantageous to employ such relays in the control system.

Returning now to the conditions on line L, the first lift contacts the backboard and at the same time micro-switch 100LS. Since this lift of paper will remain stationary, relay 100R will close energizing solenoid valve 100SV to drop the belts on that unit. The remaining units continue to run feeding additional lifts of paper along line L over switches 200LS, 300LS, etc., until these lifts accumulate against one another being pushed onto the retracted unit until finally a lift is caused to contact and dwell on micro-switch 200LS. This switch trips relay 200R and as the dwell exceeds the delay of relay 200R, it closes energizing solenoid valve 200SV and the belts on this next to last unit retract. This process will be repeated as this unit fills, switch 400LS trips relay 400R and so forth. Thus lifts of paper or any articles being conveyed will accumulate, i.e., bunch toward the right hand side of the system as seen in FIG. 4 and this bunching will continue as each of the units 200, 300, etc., becomes filled and the belts on each of the filled units retracts. Ultimately, it is possible that if no lifts are removed at the trimming operation the entire line L would eventually come to a completely loaded inactive condition.

However, let us assume that the initial lift of paper is pushed by the pushing cylinder from its position over micro-switch 100LS toward the trimmer, either at the will of the trimmer operator or automatically as the table F is cleared of articles. Immediately the circuit to relays 100R, 200R, 300R, etc., is broken as will be seen from the ladder diagram of FIG. 5. The relays open, deenergizing solenoid valves 100SV, 300SV, etc., and the belts 10 on each unit immediately move to their upper and conveying position. In effect then, the whole system is activiated and all of the units again convey articles toward the trimmer and backboard. Again the leading lift will come to a halt against the backboard, micro-switch 100LS will be actuated, time delay relay 100R will close due to the dwell time of closed switch 100LS and the entire cycle repeats itself through units 200, 300, etc., as previously described to keep the lifts continually bunching toward the trimmer.

It is believed that from the above description of the invention, it may be seen that a very efficient, relatively uncomplicated bunching conveyor can be affected from assembly of the individual units. It is also believed apparent that the units may all be identical and that the control system illustrated in FIG. 5 may have those instrumentalities, i.e., the micro-switch, relay and solenoid operated valve, such as 100LS, 100R and 100SV built into it in such a manner that the units simply plug together electrically. With this system a line L can be modified at will, units may be added or deleted as may be desirable without any effect on the control system so long as any two adjacent units are plugged together.

In describing the operation of the system used to illustrate but not limit the versatility of the invention, the lifts of paper have been indicated as of a size less than that of the dimensions of each table. The invention is not so restricted in its use, for it is believed obvious that articles of a size equal to or greater than the size of the units will be handled equally well. The only difference is that one object may bridge two units, instead of each unit being filled with more than one of the objects being conveyed.

In FIG. 5a there is disclosed a modified sensing element which may be used in place of micro-switch 100LS, etc., and associated time delay relays 100R, etc. In this alternative arrangement there is provided a tube 42 which continually exhausts air from the interior of plenum chamber 7 to the atmosphere. The tube 42 is provided with a small or variable orifice 46 opening into a chamber 43 which is divided into two compartments by a diaphram 41. The diaphram is pressure responsive and in turn closes and opens electrical contacts 45 connected directly to the belt operating solenoid valve, as for example 100SV.

It will be seen that as long as the tube 42 is uncovered the air flow therethrough will be constant. As an article blocks the tube by resting over its open end, the pressure therein will increase. As it does, it passes through orifice 46 and deflects diaphram 41 to cause contacts 45 to close, thus energizing solenoid valve 100SV to retract the belts. In this instance the time delay relays may be dispensed with because there is an appreciable time lag between the time the tube is closed and the pressure in chamber 43 varies such as to influence the diaphram 41. Of course the delay period may be varied according to the size of orifice 46 so that this trip unit may be universally adapted to commercial operations involving the problem of varying sizes of the articles being handled.

Thus there is described a conveying unit and a system in which the unit has unexpected versatility, a system and unit which may be modified to one skilled in the art. Such modifications all fall within the spirit and scope of the invention which is limited only to the extent defined in the attached claims.

Wherein, what is claimed is:

1. A conveying system for conveying articles and effecting bunching of the articles conveyed thereon comprising a plurality of substantially identical, article-supporting tables arranged in edge-to-edge relationship to define a conveyor having at least one rearwardly located loading station and one forwardly located unloading station, pneumatic means including a plenum chamber and a series of geometrically arranged apertures in the top of each table in communication with said chamber for creating a friction-reducing air cushion facilitating movement of the articles being conveyed across the top of each table and from table to table from the unloading to loading station, a retractable belt means carried by each table, drive means for causing said belt means to traverse the table top, said belt means being engageable with the articles being conveyed for moving same, carriage means for said belt means, said carriage means being vertically movable to retract and extend said belt means to and from engagement with said articles, said last mentioned means including a prime mover means on each table for raising and lowering said carriage; control means for said prime mover means comprising a series of solenoid operated valves for actuating each of said prime mover means and switch means independently associated with each of said valves and responsive to the position of the articles on each of said tables to cause retraction of each of said belt means, the switch means adjacent to the unloading station operating to effect retraction of the belt means on any table rearwardly thereof only when said switch means is engaged and operatively connected through all intermediately engaged switch means whereby the belt means on any given table will be retracted only when all of the belt means forwardly thereof are retracted responsive to the presence of an article thereon.

2. A conveying system as defined in claim 1 wherein said control means includes a series of article contacting time-delay switches disposed adjacent the discharge edge of each table throughout the system between the discharge and loading stations.

3. A conveying system as defined in claim 1 wherein said control means includes the series of pneumatically actuated switch means disposed adjacent the discharge edge of each table throughout the system between said loading and said discharge stations.

4. A conveying system as defined in claim 1 wherein said carriage means for moving said belt means into retracted and extended position and into and out of contact with the articles disposed on the conveying surface of each table includes at least a pair of bell cranks mounted on said table below the top thereof, link means connecting an identical arm of each of said bell cranks, one to the other, the opposite arm of each of said bell cranks being pivotally connected to said carriage means, said prime mover comprising a fluid motor connected to one of said bell cranks for moving said bell cranks to raise and lower said carriage.

5. A conveying unit for use in a bunching conveying system for conveying articles from place to place comprising a table-like article support including an underframe and a flat, generally rectangular, article receiving surface, said surface being provided with a series of apertures and a plenum chamber in connection therewith, said surface being further interrupted by at least one recess traversing said surface from edge-to-edge and symmetrical and parallel with respect to the other two edges thereof, a carriage means disposed in said recess, belt receiving pulleys mounted on said carriage means, a belt trained over said pulleys, the upper flight of said belt being disposed parallel to the article supporting surface, drive means for said belt means and means for moving said carriage means from an article contacting position approximately at the same plane as that of said supporting surface to a retracted position below said plane and out of contact with the articles, said means comprising bell crank means connected to said carriage and mounted on said underframe, a fluid motor connected to said bell crank means; control means for said fluid motor means, said last mentioned means including a solenoid operated valve in communication with said fluid motor and time-delay switch means mounted on said table surface and responsive to the presence of an article on said surface, said switch means actuating said valve and said fluid motor to move said carriage means and said belt from a normal article contacting position to a retracted position in response to the presence of an article on said surface and in contact with said switch means for a period exceeding the time-delay response period thereof.

References Cited in the file of this patent
UNITED STATES PATENTS

| | | |
|---|---|---|
| 629,140 | Vollkommer | July 18, 1899 |
| 2,017,535 | Hammer | Oct. 15, 1935 |
| 2,058,729 | Sekulski | Oct. 27, 1936 |
| 2,315,627 | Lamb | Apr. 6, 1943 |
| 2,346,659 | Bruce | Apr. 18, 1944 |
| 2,662,633 | Kingsley | Dec. 15, 1953 |
| 2,920,738 | Carter | Jan. 12, 1960 |
| 2,984,364 | Lamb | May 16, 1961 |